Figure 1:
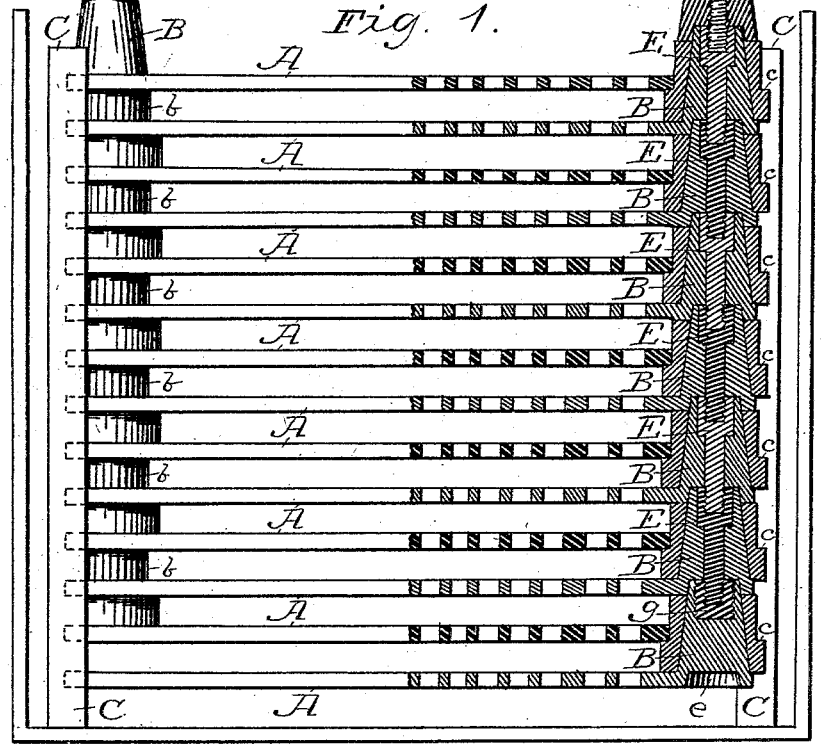

(No Model.)

H. G. OSBURN.
SECONDARY BATTERY.

No. 414,438. Patented Nov. 5, 1889.

Harry G. Osburn
Inventor

By his Attorney
Frank D. Thomason

Witnesses
Eugene H. Hill
F. H. Goin

UNITED STATES PATENT OFFICE.

HARRY GOULD OSBURN, OF CHICAGO, ILLINOIS, ASSIGNOR OF ONE-HALF TO EUGENE H. HILL, OF SAME PLACE.

SECONDARY BATTERY.

SPECIFICATION forming part of Letters Patent No. 414,438, dated November 5, 1889.

Application filed August 23, 1889. Serial No. 321,721. (No model.)

*To all whom it may concern:*

Be it known that I, HARRY GOULD OSBURN, of Chicago, Cook county, Illinois, have invented certain new and useful Improvements in Electric Batteries, of which the following is a full, clear, and exact description, reference being had to the accompanying drawings, and to the letters of reference marked thereon.

My invention relates particularly to electric storage-batteries, although it can in part or whole be applied to primary batteries, and its object is to improve and simplify the connections between each plate or grid of the complementary set of metal conductor-plates of each electrode, whereby one or more of said plates may be removed from both or either electrode; and, further, its object is to provide means for keeping separate and maintaining at their proper distance apart said plates, substantially as hereinafter fully described, and as illustrated in the drawings, in which—

Figure 5:
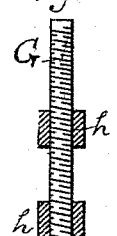
Figure 2:
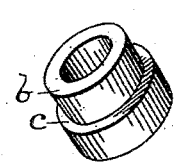
Figure 3:
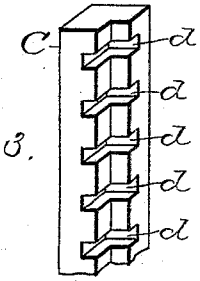
Figure 4:
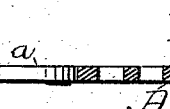

Figure 1 is a side elevation of my improved battery, showing the right-hand half thereof in vertical longitudinal section. Fig. 2 is a perspective view of an insulating device used in conjunction therewith. Fig. 3 shows a perspective view of a part of the corner support. Fig. 4 is a longitudinal central section through one of my improved plates, and Fig. 5 shows a modified form of conductors for each electrode.

In the drawings, A represents the metal conductor-plates of a battery, which are of rectangular or any other surface dimensions and are suitably constructed to hold the active material. Each electrode is provided with a series of these plates, which are each provided with a lateral lug B projecting from it near one side, the lugs of the plates of the negative electrode projecting from one side and the lugs of the plates of the positive electrode projecting from the opposite side, so that the plates of the same polarity may be connected through the medium of said lugs. The positive and negative electrodes are so arranged that the plates of each alternate with those of the other and are an equal distance apart. As it is desirable that the plates of each electrode should be of the same surface dimensions and that the negative plates should be within the area embraced within the planes drawn at right angles to the edges of the positive plates, and vice versa, I recess or cut away the edges of the plates at *a* opposite the lugs B, so that the lugs B of the plates of the opposing electrode may pass up therethrough without touching.

In order to insulate and at the same time afford a support for the edges of the plate farthest from the lugs, I provide the vulcanized-rubber insulator-sleeve *b*, which surrounds the lugs B between the adjacent plates of same polarity, and which has its upper part reduced in diameter, so as to form a shoulder *c*, upon which the free edges of said opposing-plate rest, as shown. If desired, I can further secure the plates in a given relative position by means of the corner-supports C C, which preferably consist of a length corresponding to the depth of the cell, are rectangular in cross-section, and are provided at one angle with the lateral mortises *d d*, into which the corners of the plates are inserted and fit snugly, as shown. In order to leave just as much of the plates exposed as possible, I can groove the angle of the support C, into which the mortises are cut, as shown in Fig. 3.

The lugs B project a distance corresponding to that between plates of the same polarity plus a slight distance that they enter a depression *e* in the side of the next plate opposite that from which the lug thereof projects and concentric with the center of the same. Passing centrally and longitudinally through the lug of every plate, excepting possibly the plate nearest the bottom of the cell, is a circular bore D, the diameter of which nearest the extremity of the lug being greater than the remainder thereof. In the bore of each lug I place a coupling-bolt E, the head of which fits snugly into that part of the bore D having the greatest diameter, and the barrel of which passes down through the part of the bore having the lesser diameter, with its end, which is screw-threaded, extending below the plate. The head of each of the coupling-bolts E is tapped centrally and longitudinally, and when securing the plates of each electrode together the threaded end of each bolt is secured into the head of the bolt in the lug of the plate adjacent thereto. These bolts are preferably made of copper and fit into the bores of the lugs so snugly and are screwed into one another so tightly that a perfect connection and conductor is obtained.

In order that the solution may not affect the lower end of the conductor made by the arrangement of bolts E, as described, I do not make the bore D in the lugs of the lowermost plates of each electrode, but instead tap the outer ends thereof and then screw into it a plug g, which is itself tapped and into which the bolt E, passing through the lug of the next lowermost plate of each electrode, passes.

In Fig. 5 of the drawings is shown a modified form of connecting-bolt G, which can be substituted for the bolts E. Its lower end is screwed into the plug g in the lowermost plate of each electrode. The next plate of the same electrode is then placed in position, and then the nut h is screwed down upon and into the enlarged part of the bore of the lug of said plate. After each plate is added to the electrode a nut h is screwed down onto the same in the same manner until the electrode is completed. I prefer the use of bolts E, however, as the removal of plates from the electrode is greatly facilitated.

In order to provide an appropriate cell-connection to use with my improved battery, I secure to the top of the lug of the uppermost plate of each electrode the truncated cone f by means of the bolt F, which passes centrally through and is securely embedded in said cone and is screw-threaded at each end. The lower end of this bolt F is screwed into the tapped head of the uppermost bolt E, and the upper end of the same is provided with a thumb-nut k, by manipulating which so as to clamp the connecting-wire between it and the cone assures a good contact.

What I claim as new is—

1. In an electric battery, the combination, with the metal conductor-plates of each electrode having lugs B, of the insulator-sleeve b, surrounding said lugs and provided with a shoulder c, which forms a support for the adjacent edge of the alternating plate of the opposing electrode and insulates the same from said lugs, as set forth.

2. In an electric battery, the metal conductor-plates A of the positive and negative electrodes, respectively, arranged alternately, in combination with the non-conducting corner supports C C, having lateral recesses in one of the corners thereof, into which the angles of said plates enter and rest, as and for the purpose set forth.

3. In an electric battery, the metal conductor-plates A of the positive and negative electrodes, respectively, each provided with a laterally-projecting lug B, through the medium of which plates of the same electrode are connected, in combination with the insulator-sleeves b, surrounding said lugs, and the corner supports C C, into which the angles of said plates enter and rest, as set forth.

4. In an electric battery, the metal conductor-plates A of the positive and negative electrodes, respectively, each provided with a laterally-projecting lug B, through the medium of which plates of the same electrode are connected, in combination with a threaded bolt passing longitudinally through said lug and causing the lug of the plate adjacent to the side of one plate opposite that from which its respective lug projects to bear tightly against the same, as set forth.

5. In an electric battery, the metal conductor-plates A of the positive and negative electrodes, respectively, each provided with a laterally-projecting lug B, through the medium of which plates of the same electrode are connected, in combination with a coupling-bolt E, having its head tapped longitudinally, said bolt passing longitudinally through the lug B of one plate and into the head of the bolt in the lug of the plate adjacent to its threaded end, as set forth.

6. In an electric battery, the metal conductor-plates A of the negative and positive electrodes, respectively, each provided with a laterally-projecting lug B, in combination with the bolts E, having their heads tapped longitudinally and passing longitudinally through said lugs, and the tapped plug g, inserted into the end of the lug of the lowermost plate of each electrode and into which the lower end of the bolt E, passing through the lug of the next lowermost plate of each electrode, enters.

HARRY GOULD OSBURN.

Witnesses:
 FRANK D. THOMASON,
 EUGENE H. HILL.